United States Patent
Matsunobu

(10) Patent No.: US 11,926,723 B2
(45) Date of Patent: Mar. 12, 2024

(54) PRODUCTION METHOD OF RESIN POROUS MATERIAL

(71) Applicant: Prime Planet Energy & Solutions, Inc., Tokyo (JP)

(72) Inventor: Kohei Matsunobu, Toyota (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 231 days.

(21) Appl. No.: 17/502,002

(22) Filed: Oct. 14, 2021

(65) Prior Publication Data

US 2022/0119613 A1  Apr. 21, 2022

(30) Foreign Application Priority Data

Oct. 15, 2020 (JP) .................................. 2020-173668

(51) Int. Cl.
```
C08J 9/28      (2006.01)
C08L 1/12      (2006.01)
C08L 23/08     (2006.01)
C08L 27/16     (2006.01)
C08L 27/20     (2006.01)
C08L 29/04     (2006.01)
H01M 4/04      (2006.01)
```

(52) U.S. Cl.
CPC . *C08J 9/28* (2013.01); *C08L 1/12* (2013.01); *C08L 23/08* (2013.01); *C08L 23/0861* (2013.01); *C08L 27/16* (2013.01); *C08L 27/20* (2013.01); *C08L 29/04* (2013.01); *H01M 4/0404* (2013.01); *C08J 2201/0502* (2013.01); *C08J 2201/0504* (2013.01); *C08J 2301/12* (2013.01); *C08J 2323/08* (2013.01); *C08J 2327/16* (2013.01); *C08J 2327/20* (2013.01); *C08J 2329/04* (2013.01); *C08L 2203/16* (2013.01)

(58) Field of Classification Search
CPC .... C08J 9/28–286; C08J 2201/05–0504; C08J 2201/054–0547
See application file for complete search history.

(56) References Cited

U.S. PATENT DOCUMENTS

| | | | |
|---|---|---|---|
| 3,671,345 A * | 6/1972 | Barnes .................. | B32B 27/304 156/289 |
| 5,238,636 A | 8/1993 | Furukawa et al. | |
| 6,177,181 B1 | 1/2001 | Hamada et al. | |
| 2006/0081530 A1 * | 4/2006 | Beard .................... | B01D 71/30 96/4 |
| 2014/0138304 A1 * | 5/2014 | Shiotani ..................... | C08J 9/28 521/88 |
| 2015/0075027 A1 | 3/2015 | Maehara et al. | |
| 2015/0179996 A1 | 6/2015 | Inaba et al. | |
| 2021/0061970 A1 | 3/2021 | Matsunobu et al. | |
| 2021/0280942 A1 * | 9/2021 | Matsunobu ........... | H01M 50/46 |

FOREIGN PATENT DOCUMENTS

| | | |
|---|---|---|
| CN | 104272502 A | 1/2015 |
| JP | H1171476 A | 3/1999 |
| JP | 2000143848 A | 5/2000 |
| JP | 2000296668 A | 10/2000 |
| JP | 2004111157 A | 4/2004 |
| JP | 201067358 A | 3/2010 |
| JP | 2011-236292 A | 11/2011 |
| JP | 201731299 A | 2/2017 |
| JP | 2017164726 A | 9/2017 |
| JP | 2020119697 A | 8/2020 |
| JP | 2021-30666 A | 3/2021 |
| WO | 8908679 A1 | 9/1989 |
| WO | 9825997 A1 | 6/1998 |
| WO | 2013137237 A1 | 9/2013 |

OTHER PUBLICATIONS

Machine Translation of JP2017-164726A. Sep. 21, 2017. (Year: 2017).*
Choi et al. Highly Stable Porous Polyimide Sponge as a Separator for Lithium-Metal Secondary Batteries. Nanomaterials, 2020, 10, 1976. Published online Oct. 6, 2020. (Year: 2020).*
Application JP2020-038451. Filed Mar. 6, 2020. (Year: 2020).*
Machine Translation of application JP2020-038451. Filed Mar. 6, 2020. (Year: 2020).*

* cited by examiner

*Primary Examiner* — Stephen E Rieth
(74) *Attorney, Agent, or Firm* — HAUPTMAN HAM, LLP

(57) ABSTRACT

Provided is a method that can produce a resin porous material from a water-insoluble polymer in a small number of steps while suppressing the formation of skin layers. The production method of a resin porous material disclosed herein includes preparing a solution of a water-insoluble polymer in a mixed solvent including a good solvent of the water-insoluble polymer and a poor solvent of the water-insoluble polymer, and drying the solution to remove the mixed solvent. The poor solvent has a higher boiling point than the good solvent. The drying the solution is performed using superheated water vapor.

3 Claims, 3 Drawing Sheets

PRODUCTION METHOD OF RESIN POROUS MATERIAL

BACKGROUND OF THE INVENTION

1. Field of the Invention

The present disclosure relates to a production method of a resin porous material. This application claims the benefit of foreign priority to Japanese Patent Application No. 2020-173668, filed on Oct. 15, 2020, the entire contents of which are incorporated herein by reference.

2. Description of the Related Art

Resin porous materials using water-insoluble polymers may exhibit various characteristics such as lightness, cushioning characteristics, thermal insulation properties, sound-absorbing properties, separability, and adsorptive properties. Thus, resin porous materials using water-insoluble polymers are used in a wide variety of uses, for example, for packing materials, construction materials, sound-absorbing materials, cleaning utensils, cosmetic utensils, separation membranes, adsorbing materials, purification carriers, catalyst carriers, culture carriers, and the like.

A simple method is desired for a production method of a resin porous material using a water-insoluble polymer from the viewpoint of production costs. Thus, as a method for simply producing a porous material of polyvinylidene fluoride, which is a water-insoluble polymer, Japanese Patent Application Publication No. 2011-236292 discloses a method for producing a porous material of polyvinylidene fluoride, including the steps of dissolving polyvinylidene fluoride in a mixed solvent of a good solvent and a poor solvent of polyvinylidene fluoride under heating to prepare a solution, cooling the solution to obtain a molded body, dipping the molded body in another solvent to replace the mixed solvent by the other solvent, and drying and removing the other solvent.

SUMMARY OF THE INVENTION

However, in the production method of the above conventional technique, many steps such as the steps of preparing a solution of a water-insoluble polymer, precipitating a molded body, replacing solvents, and drying are required. As a result of the studies by the present inventors, the present inventors have found that skin layers (skinned layers) that do not have pores are easily formed at the surface of the resin porous material in the method for producing a resin porous material. When the resin porous material has skin layers, fluid cannot penetrate and thus there is a disadvantage that the uses of the resin porous material are limited.

Thus, an object of the present disclosure is to provide a method that can produce a resin porous material from a water-insoluble polymer in a small number of steps while suppressing the formation of skin layers.

The production method of a resin porous material disclosed herein includes preparing a solution of a water-insoluble polymer in a mixed solvent including a good solvent of the water-insoluble polymer and a poor solvent of the water-insoluble polymer, and drying the solution to remove the mixed solvent. The poor solvent has a higher boiling point than the good solvent. The drying the solution is performed using superheated water vapor. According to such a constitution, a method that can produce a resin porous material from a water-insoluble polymer in a small number of steps while suppressing the formation of skin layers is provided.

In a desired mode of the production method disclosed herein, the production method further includes, after preparing the solution and before drying the solution, applying the prepared solution of the water-insoluble polymer on a surface of a substrate in a thin film form. According to such a constitution, a method that can produce a resin porous film from a water-insoluble polymer in a small number of steps while suppressing the formation of skin layers is provided. In this case, when the substrate is an electrode of a secondary battery, an electrode-integrated separator for a secondary battery can be produced.

From the viewpoint of the use of the obtained resin porous material and the usefulness of the production method of the resin porous material, in a desired mode of the production method disclosed herein the water-insoluble polymer is an ethylene-vinyl alcohol copolymer or a vinylidene fluoride-hexafluoropropylene copolymer.

DESCRIPTION OF THE PREFERRED EMBODIMENTS

Figure 1:
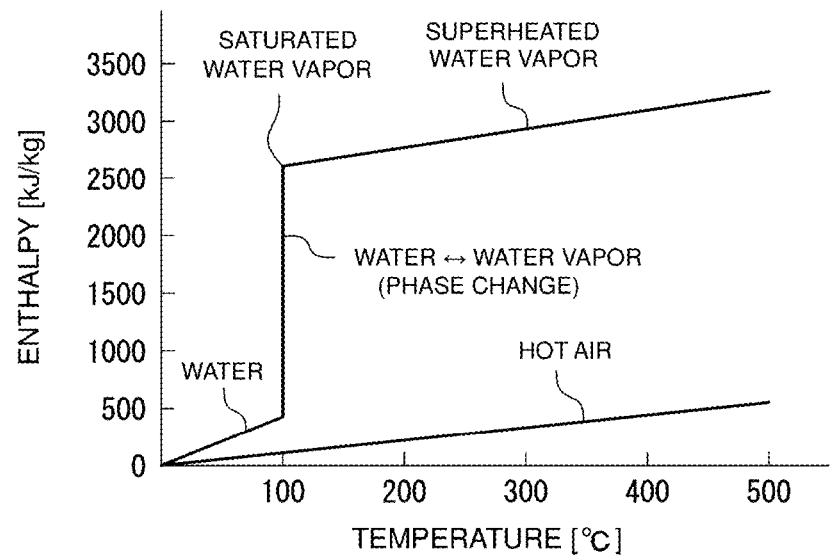
FIG. 1 is a graph comparing the enthalpy of superheated water vapor with the enthalpy of hot air.

The production method of the resin porous material according to the present disclosure includes a step of preparing a solution of a water-insoluble polymer in a mixed solvent including a good solvent of the water-insoluble polymer and a poor solvent of the water-insoluble polymer (hereinafter, referred to as the "solution preparation step") and a step of drying the solution to remove the mixed solvent (hereinafter, referred to as the "drying step"). Here, the poor solvent has a higher boiling point than the good solvent. The drying the solution is performed using superheated water vapor.

The solution preparation step is first explained. The "good solvent of a water-insoluble polymer" used in the present disclosure refers to a solvent exhibiting a solubility to a water-insoluble polymer at 25° C. of 1 mass % or more. The good solvent desirably exhibits a solubility to a water-insoluble polymer at 25° C. of 2.5 mass % or more, more desirably exhibits a solubility of 5 mass % or more, further desirably exhibits a solubility of 7.5 mass % or more, and most desirably exhibits a solubility of 10 mass % or more. The type of the good solvent used in the present disclosure may be selected, as appropriate, according to the type of the water-insoluble polymer. The good solvent may be a single solvent or may be a mixed solvent in which two or more solvents are mixed.

The "poor solvent of a water-insoluble polymer" used in the present disclosure refers to a solvent exhibiting a solubility to a water-insoluble polymer at 25° C. of less than 1 mass %. The poor solvent desirably exhibits a solubility to a water-insoluble polymer at 25° C. of 0.5 mass % or less, more desirably exhibits a solubility of 0.2 mass % or less, further desirably exhibits a solubility of 0.1 mass % or less, and most desirably exhibits a solubility of 0.05 mass % or less. The type of the poor solvent to be used in the present disclosure may be selected, as appropriate, according to the type of the water-insoluble polymer. The poor solvent may be a single solvent or may be a mixed solvent in which two or more solvents are mixed.

Hansen solubility parameters (HSP) may be used to determine whether a specific solvent is a good solvent or a poor solvent to a specific polymer compound. For example, assuming that the dispersion term, the polar term, and the hydrogen bond term of the HSP of the polymer compound are respectively taken as $\delta_{D1}$, $\delta_{P1}$, $\delta_{H1}$ and the dispersion term, the polar term, and the hydrogen bond term of the HSP of the solvent are respectively taken as $\delta_{D2}$, $\delta_{P2}$, $\delta_{H2}$, the solubility of the polymer compound tends to be higher as the value of the HSP distance Ra (MPa$^{1/2}$) between the polymer compound and the solvent represented by the following formula is smaller.

$$Ra^2=4(\delta_{D1}-\delta_{D2})^2+(\delta_{P1}-\delta_{P2})^2+(\delta_{H1}-\delta_{H2})^2$$

Assuming that the interaction radius of the specific polymer compound is taken as $R_0$, it is predicted that the specific polymer compound is soluble when the ratio Ra/$R_0$ is less than 1, partially soluble when the ratio Ra/$R_0$ is 1, and insoluble when the ratio Ra/$R_0$ exceeds 1.

Alternatively, whether a specific solvent is a good solvent or a poor solvent to a specific polymer compound can easily be judged by a test of mixing the polymer compound and the solvent in a sample bottle or the like.

The good solvent and the poor solvent are mixed and used as a homogeneous solvent. Thus, the good solvent and the poor solvent are compatible with each other. In the present disclosure, the poor solvent used has a higher boiling point than the good solvent used. The boiling point of the poor solvent is desirably 10° C. or higher, more desirably 90° C. or higher than the boiling point of the good solvent because a homogeneous porous material with a relatively high porosity can be easily obtained. The boiling point of the poor solvent is desirably less than 300° C. in view of the drying rate.

In the present disclosure, the "water-insoluble polymer" refers to a polymer having a solubility in water at 25° C. of less than 1 mass %. The solubility of the water-insoluble polymer in water at 25° C. is desirably 0.5 mass % or less, more desirably 0.2 mass % or less, and further desirably 0.1 mass % or less.

The "water-insoluble polymer" used in the solution preparation step is the same polymer as the water-insoluble polymer constituting the porous molded body. As the water-insoluble polymer, a polymer for which a good solvent and a poor solvent exist is used. The type of the water-insoluble polymer is not particularly limited as long as a good solvent and a poor solvent exist for the polymer. Examples of the water-insoluble polymer include olefin resins such as polyethylene and polypropylene; fluorine-containing resins such as polyvinyl fluoride, polyvinylidene fluoride, and vinylidene fluoride-hexafluoropropylene copolymer; (meth) acrylic resins such as poly(methyl (meth)acrylate)s and poly(ethyl (meth)acrylate)s; styrenic resins such as polystyrene, styrene-acrylonitrile copolymers, and acrylonitrile-butadiene-styrene copolymers; water-insoluble cellulose derivatives such as ethyl cellulose, cellulose acetate, and cellulose propionate; vinyl chloride-based resins such as polyvinyl chloride and ethylene-vinyl chloride copolymers; ethylene-vinyl alcohol copolymers, and the like. Polymers obtained by modifying a water-soluble polymer into a water-insoluble polymer, or the like may also be used. Among them, the water-insoluble polymer is desirably an aliphatic polymer compound (that is, a polymer compound that does not contain an aromatic ring) in view of the usefulness of the porous material of the water-insoluble polymer and the usefulness of the production method thereof. Since a homogeneous porous material with a relatively high porosity can be easily obtained, the water-insoluble polymer is desirably an addition-polymerized polymer compound (that is, a polymer compound generated by the polymerization of ethylenically-unsaturated double bonds of monomers having the ethylenically-unsaturated double bonds; for example, a vinyl polymer, a vinylidene polymer). The water-insoluble polymer is desirably an ethylene-vinyl alcohol copolymer or a vinylidene fluoride-hexafluoropropylene copolymer in view of the usefulness of the porous material having a three-dimensional network porous structure and the usefulness of the production method thereof.

Although the average polymerization degree of the water-insoluble polymer is not particularly limited, it is desirably 70 or more and 500,000 or less, and more desirably 100 or more and 200,000 or less. The average polymerization degree of the water-insoluble polymer can be determined by a known method (for example, NMR measurements, or the like).

Hereinafter, a suitable good solvent and a suitable poor solvent are specifically explained while referring to a specific water-insoluble polymer as an example. The production method of the present disclosure may be advantageously implemented by using the good solvent and the poor solvent which are described below with respect to the water-insoluble polymer as described below. The good solvent listed below may be used singly or may be used in combination of two or more of these. The poor solvent listed below may be used singly or may be used in combination of two or more of these.

1. In a Case where the Water-Insoluble Polymer is an Ethylene-Vinyl Alcohol Copolymer An ethylene-vinyl alcohol copolymer (EVOH) is a copolymer containing ethylene units and vinyl alcohol units as monomer units. Although the ethylene unit content in the EVOH is not particularly limited, it is desirably 10 mol % or more, more desirably 15 mol % or more, further desirably 20 mol % or more, and particularly desirably 25 mol % or more. The ethylene unit content in the EVOH is desirably 60 mol % or less, more desirably 50 mol % or less, and further desirably 45 mol % or less. Although the saponification degree of the EVOH is not particularly limited, it is desirably 80 mol % or more, more desirably 90 mol % or more, and further desirably 95 mol % or more. The upper limit of the saponification degree is determined depending on the technical limitations related to the saponification and is, for example, 99.99 mol %. The ethylene unit content in the EVOH and the saponification degree of the EVOH may be determined by a known method (for example, $^1$H-NMR measurement or the like).

An EVOH is normally produced by saponifying a copolymer of ethylene and a vinyl ester using an alkali catalyst and the like. Thus, an EVOH may contain vinyl ester units. The vinyl ester of the unit is typically vinyl acetate and may be vinyl formate, vinyl propionate, vinyl valerate, vinyl caprate, vinyl laurate, or the like. The EVOH may contain other monomer units than ethylene units, vinyl alcohol units, and vinyl ester units within a range that does not significantly impair the effect of the present disclosure.

As a suitable good solvent for the EVOH, a mixed solvent of water and an alcohol, dimethyl sulfoxide (DMSO), or the like may be mentioned. The alcohol used in the mixed solvent is desirably propyl alcohol. The propyl alcohol may be either n-propyl alcohol or isopropyl alcohol. Thus, a particularly suitable good solvent is a mixed solvent of water and propyl alcohol, or dimethyl sulfoxide (DMSO).

Examples of poor solvents suitable for the EVOH include water; alcohols; cyclic esters such as γ-butyrolactone; cyclic carbonates such as propylene carbonate; cyclic sulfones such as sulfolane; ether group-containing monools such as propylene glycol monomethyl ether, propylene glycol monoethyl ether, diethylene glycol monomethyl ether, diethylene glycol monoethyl ether, and 2-ethoxyethanol; diols such as 1,3-butanediol, 1,4-butanediol, 1,5-pentanediol, and 1,6-hexanediol. Among them, cyclic esters, cyclic carbonates, cyclic sulfones, or ether group-containing monools are desired, γ-butyrolactone, propylene carbonate, sulfolane, or ether group-containing monools are more desired, and γ-butyrolactone or sulfolane are further desired. The solubility parameter (Hildebrand SP value) δ of the poor solvent is desirably larger than the solubility parameter δ of the EVOH by 1.6 $MPa^{1/2}$ or more.

Water and an alcohol are each a poor solvent of an EVOH. Still, a mixed solvent of water and an alcohol (particularly, propyl alcohol) is a good solvent of an EVOH. Here, the mixed solvent of water and an alcohol can be deemed as a mixed solvent of another mixed solvent, which is a good solvent, of water and an alcohol from which water is reduced and water, which is a poor solvent having a higher boiling point than the another mixed solvent, and thus, a mixed solvent of water and an alcohol may be used singly for preparing an EVOH solution. Thus, in the present disclosure, when a solvent which is a mixture of two or more types of poor solvents becomes a good solvent for a specific water-insoluble polymer, a mixed solvent of these two or more types of poor solvents may be used singly as a mixed solvent containing the good solvent of the water-insoluble polymer and the poor solvent of the water-insoluble polymer for preparation of a solution.

2. In a Case where the Water-Insoluble Polymer is Cellulose Acetate

Example of good solvents suitable for cellulose acetate include nitrogen-containing polar solvents (particularly, nitrogen-containing aprotic polar solvents) such as N,N-dimethylformamide, N,N-dimethylacetamide, and N-methylpyrrolidone; esters such as methyl formate and methyl acetate; ketones such as acetone and cyclohexanone; cyclic ethers such as tetrahydrofuran, dioxane, and dioxolane; glycol derivatives such as methyl glycol and methyl glycol acetate; halogenated hydrocarbons such as methylene chloride, chloroform, and tetrachloroethane; cyclic carbonates such as propylene carbonate; sulfur-containing polar solvents (particularly, sulfur-containing aprotic polar solvents) such as DMSO, and the like. Among them, a sulfur-containing aprotic polar solvent is desired and DMSO is more desired.

Examples of poor solvents suitable for cellulose acetate include water, alcohols such as 1-hexanol, 1,3-butanediol, 1,4-butanediol, 1,5-pentanediol, and 1,6-hexanediol. As the alcohols, $C_{4-6}$ monohydric or dihydric alcohols are desired.

3. In a Case where the Water-Insoluble Polymer is Polyvinylidene Fluoride

Examples of good solvents suitable for polyvinylidene fluoride include nitrogen-containing polar solvents (particularly, nitrogen-containing aprotic polar solvents) such as N,N-dimethylformamide, N,N-dimethylacetamide, and N-methylpyrrolidone; sulfur-containing polar solvents (particularly, sulfur-containing aprotic polar solvents) such as DMSO, and the like. Among them, nitrogen-containing aprotic polar solvents are desired and N,N-dimethylformamide is more desired.

Examples of poor solvents suitable for polyvinylidene fluoride include water, alcohols such as 1-hexanol, 1,3-butanediol, 1,4-butanediol, 1,5-pentanediol, 1,6-hexanediol, and glycerin; cyclic ethers such as tetrahydrofuran, dioxane, and dioxolane, or the like. Among them, alcohols are desired and $C_{3-6}$ dihydric or trihydric alcohols are more desired.

4. In a Case where the Water-Insoluble Polymer is a Vinylidene Fluoride-Hexafluoropropylene Copolymer A vinylidene fluoride-hexafluoropropylene copolymer (P(VDF-HFP)) is a copolymer containing vinylidene fluoride units and hexafluoropropylene units as monomer units. The copolymerization proportion of these units is not particularly limited and may be determined depending on the characteristics of the separator. Vinylidene fluoride-hexafluoropropylene copolymers are available by syntheses according to known methods and also some products (for example, Kynar FLEX 2850-00, 2800-00, 2800-20, 2750-01, 2500-20, 3120-50, 2851-00, 2801-00, 2821-00, 2751-00, 2501-00, etc., all produced by Arkema S. A.) are commercially available.

Examples of good solvents suitable for the P(VDF-HFP) include ketones such as acetone and methyl ethyl ketone; cyclic ethers such as tetrahydrofuran; nitrogen-containing polar solvents (particularly, nitrogen-containing aprotic polar solvents) such as N,N-dimethylformamide, N,N-dimethylacetamide, and N-methylpyrrolidone; sulfur-containing polar solvents (particularly, sulfur-containing aprotic polar solvents) such as DMSO, or the like. Since it is easy to remove the solvent by vaporization, acetone, methyl ethyl ketone, or tetrahydrofuran is desired, and acetone or methyl ethyl ketone is more desired as the good solvent.

Examples of suitable poor solvents for the P(VDF-HFP) include water, alcohols such as 1-hexanol, 1,2-propanediol, 1,3-butanediol, 1,4-butanediol, 1,5-pentanediol, 1,6-hexanediol, and glycerin, and the like. Water or a $C_{3-6}$ dihydric or trihydric alcohol is desired as the poor solvent in view of low load on the environment, easy availability, easy handleability, or the like.

The amounts of the water-insoluble polymer, the good solvent, and the poor solvent used may be determined, as appropriate, depending on the types of these used. The mixing amount of the water-insoluble polymer is desirably 1 part by mass or more, more desirably 5 parts by mass or more, further desirably 10 parts by mass or more relative to 100 parts by mass of the good solvent. The mixing amount of the water-insoluble polymer is desirably 40 parts by mass or less, more desirably 35 parts by mass or less, and further desirably 30 parts by mass or less relative to 100 parts by mass of the good solvent. The mixing amount of the poor solvent is desirably 10 parts by mass or more, more desirably 20 parts by mass or more, further desirably 30 parts by mass or more relative to 100 parts by mass of the good solvent. The mixing amount of the poor solvent is desirably 400 parts by mass or less, more desirably 200 parts by mass or less, further desirably 100 parts by mass or less relative to 100 parts by mass of the good solvent. The state of pores in an obtained porous material (for example, porosity, pore diameter, etc.) can be controlled by changing these amounts.

The solution of the water-insoluble polymer may further contain other components other than the water-insoluble polymer and the mixed solvent within a range that does not significantly impair the effect of the present disclosure.

Preparation methods of the solution of a water-insoluble polymer are not particularly limited. The water-insoluble polymer may be first dissolved in the good solvent, then the poor solvent may be added thereto, and the mixture may be uniformly mixed. Alternatively, the water-insoluble polymer may be added to a mixed solvent of the good solvent and the poor solvent, to dissolve the water-insoluble polymer. Known stirring devices, mixing devices, or the like may be used for the preparation of the solution. Ultrasonic irradiation, heating, and the like may be performed when the solution of the water-insoluble polymer is prepared. The heating temperature is, for example, 40° C. or higher and 100° C. or lower. After preparing the solution of the water-insoluble polymer by heating, the solution may be cooled within a range where the good solvent and the poor solvent do not separate. This cooling is desirably performed within a range where the water-insoluble polymer does not precipitate because the precipitated water-insoluble polymer may be an impurity.

Next, the drying step is explained. In the drying step, the solution of the water-insoluble polymer prepared as above is dried to remove the mixed solvent. Furthermore, the drying the solution is performed using superheated water vapor. In the drying step, porous skeletons of the water-insoluble polymer are formed. In the drying step, the operation for removing the mixed solvent, specifically, the vaporization of the poor solvent, forms pores to thereby obtain a resin porous material.

Typically, for example, pores are formed by phase separation between the water-insoluble polymer and a mixed solvent in which the poor solvent is concentrated. Specifically, the poor solvent has a higher boiling point than the good solvent, and therefore, the good solvent preferentially vaporizes prior to the poor solvent in this step. As the amount of the good solvent decreases, the concentration of the poor solvent in the mixed solvent increases. Since the solubility of the water-insoluble polymer in the poor solvent is smaller than the solubility in the good solvent, the water-insoluble polymer and the mixed solvent in which the poor solvent is concentrated are phase-separated and porous skeletons of the water-insoluble polymer are formed. This phase separation may be a spinodal decomposition. Eventually, the good solvent is removed and the water-insoluble polymer precipitates, and the poor solvent having a higher boiling point is removed by vaporization and pores generate. In this way, the porous material of the water-insoluble polymer generates. For causing the phase separation between the water-insoluble polymer and the mixed solvent in which the poor solvent is concentrated, the type and amount of the good solvent and the type and amount of the poor solvent may be appropriately selected.

Here, when the solution of the water-insoluble polymer is dried by heating or under reduced pressure, the surface of the solution of the water-insoluble polymer exposed to the atmosphere becomes a drying interface. The vaporization rate of the mixed solvent is larger at the surface or in the vicinity of the surface (that is, in the surface portion) of the solution than inside the solution, whereby the composition becomes heterogeneous between the surface portion and the inside of the solution. As a result, pores are not formed at the surface portion of the solution, and a skin layer is formed at the surface of the obtained resin porous material.

In contrast, the drying is performed using superheated water vapor in the present disclosure. Thus, this drying involves contact between superheated water vapor and the solution of the water-insoluble polymer. Thus, the drying is performed under the presence of superheated water vapor, particularly under a superheated water vapor atmosphere. The formation of skin layers at the surface portion of the resin porous material is suppressed by performing the drying using superheated water vapor. The reason is considered as follows.

Superheated water vapor is water vapor heated to 100° C. or higher. Superheated water vapor has a far larger enthalpy than hot air, as indicated in FIG. 1, and the heat is transferred by the composite heat transfer including convection, radiation, and condensation. Thus, superheated water vapor enables more rapid heating compared to other heating methods, such as a method using hot air.

When the solution of the water-insoluble polymer is placed in an atmosphere in which superheated water vapor exists, the superheated water vapor is condensed at the surface of the solution of the water-insoluble polymer, and a water layer is formed on the surface of the solution of the water-insoluble polymer. The solvent in the solution of the water-insoluble polymer and water in the water layer are vaporized by the heat transferred from the water layer, and the solution of the water-insoluble polymer is dried. Here, since water is a poor solvent of the water-insoluble polymer, the phase separation is caused by water at the surface portion of the solution of the water-insoluble polymer, and porous skeletons and pores are formed at the surface portion due to this phase separation. Thus, porosification is actively caused at the surface portion of the solution of the water-insoluble polymer by drying using superheated water vapor, and the formation of skin layers at the surface portion of the obtained porous material can be suppressed.

Drying the solution of the water-insoluble polymer using superheated water vapor may be performed, for example, by introducing superheated water vapor generated according to a known method into a drying furnace, drying chamber, or the like and placing the solution of the water-insoluble polymer in the drying furnace, drying chamber, or the like. Since superheated water vapor is water vapor of 100° C. or higher, the drying temperature is 100° C. or higher, desirably 140° C. or higher, and more desirably 150° C. or higher and 200° C. or lower. A specific example of the implementing method of the drying step is explained below.

Figure 2:
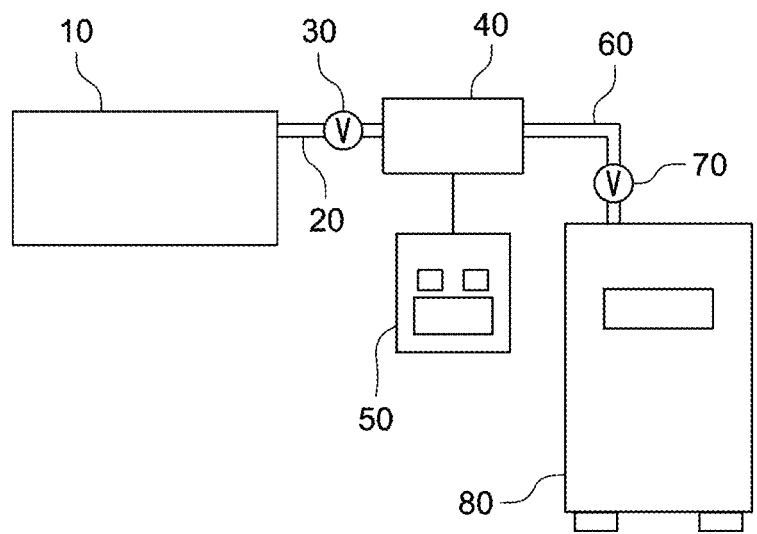
FIG. 2 is an explanatory drawing of one example of the implementation method of the drying step in the production method of the present disclosure.

A drying furnace into which superheated water vapor can be introduced is prepared. A constitution example of the drying furnace is illustrated in FIG. 2. In the example illustrated in FIG. 2, a heat exchanger 40 as heating means is connected to the drying furnace 10 via a superheated water vapor introduction pipe 20. The drying furnace 10 may be a batch-type furnace or may be a continuous furnace provided with a belt conveyor or the like. The superheated water vapor introduction pipe 20 has a first valve 30. The heat exchanger 40 is electrically connected to a control panel 50. The heat exchanger 40 is provided therein with a tube (not illustrated), which constitutes a flow channel of a heat medium. The heat exchanger 40 is connected to a boiler 80 as water vapor generation means via a water vapor introduction pipe 60. The water vapor introduction pipe 60 has a second valve 70.

Water vapor is generated in the boiler 80 in a state where the first valve 30 and the second valve 70 are closed. The second valve 70 is then opened and the water vapor is introduced in the heat exchanger 40 via the water vapor introduction pipe 60. A heat medium is passed through a tube in the heat exchanger 40 and the water vapor is heated via the tube. At this time, the temperature and the flow rate of the heat medium are controlled by the control panel 50. The temperature of the heat medium is appropriately selected among temperatures exceeding 100° C. according to the temperature in the drying furnace 10. The water vapor is converted into superheated water vapor by this heating. Alternatively, superheated water vapor may be generated by a known superheated water vapor generation device.

The first valve 30 is then opened, and the superheated water vapor is introduced into the drying furnace 10 via the superheated water vapor introduction pipe 20. At this time, the inside of the drying furnace 10 is heated to 100° C. or higher in advance so that superheated water vapor should not be condensed in the drying furnace 10. The heating temperature of the drying furnace is desirably 140° C. or higher, and more desirably 150° C. or higher and 200° C. or lower. In the drying process, the heat is removed from the solution of the water-insoluble polymer upon the vaporization of the mixed solution, and the solution is cooled. Therefore, the temperature of the solution of the water-insoluble polymer is normally lower than the temperature in the drying furnace. Thus, the temperature in the drying furnace may be equal to or higher than the melting point of the water-insoluble polymer.

A solution of the water-insoluble polymer is placed in the drying furnace 10 into which the superheated water vapor has been introduced. The superheated water vapor comes into contact with the solution of the water-insoluble polymer, the mixed solvent in the solution is then vaporized by the heat of the superheated water vapor, and the drying is performed. It is desired to continue introducing superheated water vapor into the drying furnace 10 during drying.

To obtain a porous material having a desired shape, a method in which the solution of the water-insoluble polymer is poured into a mold having a shape corresponding to the desired shape, and this solution is dried using superheated water vapor may be desirably used. To obtain a film-shaped porous material, a method in which the solution of the water-insoluble polymer is applied onto the surface of a substrate in a thin film form, and this thin film is dried using superheated water vapor may be desirably used.

Since there are many beneficial applications, it is desired in the present disclosure to obtain a film-shaped porous material. Therefore, the production method according to the present disclosure desirably includes, after the solution preparing step and before the drying step, a step (hereinafter, referred to as the "applying step") of applying the prepared solution of the water-insoluble polymer on a surface of a substrate in a thin film form.

The applying step in the case of obtaining a film-shaped resin porous material is described in detail. The substrate to be used is not particularly limited as long as it functions as a substrate. The substrate may be one which is used in a manner in which it is finally peeled off from the porous material or may be one which is used without being peeled off from the porous material. The shape of the substrate is not particularly limited, and one having a flat surface is desired. Examples of the shapes include sheet shapes, film shapes, foil shapes, plate shapes, and the like. Examples of the material constituting the substrate include resins, glass, metals, or the like.

Examples of the resins include polyethylene terephthalate (PET), polyethylene naphthalate (PEN), polyethylene (PE), polypropylene (PP), polystyrene, polyvinyl chloride, poly (meth)acrylates, polycarbonates, polyimides, polyamides, polyamideimides, and the like.

Examples of the metals include aluminum, copper, nickel, stainless steel, and the like. Composite materials, for example, fiber-reinforced resins such as glass fiber-reinforced epoxy resins may be used as a substrate.

The substrate may have a multilayered structure. For example, the substrate may have a release layer containing a fluorine resin. For example, the substrate may be a paper sheet provided with a resin layer, or the like.

When the substrate is used in an unpeeled form, the substrate may serve as a functional layer of the obtained resin porous material. For example, the substrate may have a function as a reinforcing material, supporting material, or the like. The substrate may be an electrode of a secondary battery (particularly, an active material layer of an electrode of a secondary battery). In this case, the production method of the resin porous material can be modified to a production method of an electrode-integrated separator of a secondary battery.

The application method of the solution of the water-insoluble polymer is not particularly limited and may be selected, as appropriate, according to the type of the substrate. Examples of the application methods include die coating methods, gravure coating methods, roll coating methods, spin coating methods, dip coating methods, bar coating methods, blade coating methods, spray coating methods, casting methods, and the like. The application thickness is not particularly limited and may be set, as appropriate, according to the uses of the porous material. For example, the application thickness may be 1 µm or more and 500 µm or less, and desirably 10 µm or more and 300 µm or less.

A film-shaped porous material (that is, a resin porous film) can be obtained by subjecting the solution of the water-insoluble polymer applied onto a substrate, obtained as above, to the drying step.

Various shapes, including a film shape, of the resin porous material can be obtained in the manner as described above. The resin porous material has a three-dimension network porous structure in which pores communicate from one principal plane to the opposing principal plane because the formation of skin layers is suppressed. According to the production method of the present disclosure, a porous material having an average pore diameter of, for example, 0.5 µm or more (particularly 0.9 µm or more, further 1.4 µm or more) and 5 µm or less (particularly 4.2 µm or less, further 3.8 µm or less) can be obtained. The average pore diameter can be determined as an average of diameters of 100 or more pores in a photographed cross-sectional electron micrograph of a porous material. When the sectional shape of a pore is not spherical, the average of the maximum diameter and the minimum diameter of the pore may be regarded as a pore diameter. According to the production method of the present disclosure, a porous material with a porosity of, for example, 15% or more (particularly 42% or more, further 51.5% or more, still further 61.5% or more) and less than 80% (particularly less than 75%) can be obtained. The porosity can be calculated by a known method using a true density and an apparent density.

According to the present disclosure, an operation to cool and precipitate a molding body and an operation to replace solvents are not required and a resin porous material can be produced by the steps of preparing a solution of a water-insoluble polymer and removing good solvents and poor solvents by drying. That is, according to the present disclosure, a resin porous material can be produced in a small number of steps. In the present disclosure, the skin layer formation at the surface portion of the resin porous material is suppressed. Thus, the resin porous material may be used in a width range of uses.

Examples of the uses of the resin porous materials include packing materials, construction materials, sound absorbing material, cleaning utensils, cosmetic utensils, separation membranes, adsorbing materials, purification carriers, catalyst carriers, culture carriers, and the like. Taking advantage that electrolyte can penetrate since no skin layer is present, the resin porous material can be used as a separator for a secondary battery. When the resin porous material is applied to the use for separators, a separator can be formed directly on an active material layer, and therefore, it is advantageous in the production of separators.

Thus, the above production method can be applied to a production method of an electrode-integrated separator of a secondary battery, including the steps of preparing a solution of a water-insoluble polymer in a mixed solvent including a good solvent of the water-insoluble polymer and a poor solvent of the water-insoluble polymer, applying the prepared solution onto an active material layer of an electrode, and drying the applied solution to remove the mixed solvent, in which the poor solvent has a higher boiling point than the good solvent, and the drying of the applied solution is performed using superheated water vapor.

When the electrode is a positive electrode, the active material layer (that is, a positive electrode active material layer) may contain a positive electrode active material. Examples of the positive electrode active material include lithium transition metal oxides (such as $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$), lithium transition metal phosphate compounds (such as $LiFePO_4$), and the like. The positive electrode active material layer may contain other components than the active material, such as conductive materials, binders, or lithium phosphates. For example, carbon materials such as carbon black, including acetylene black (AB), or other carbon materials (such as graphite) may suitably be used as a conductive material. For example, polyvinylidene fluoride (PVDF) or the like may be used as a binder.

When the electrode is a negative electrode, the active material layer (that is, a negative electrode active material layer) may contain a negative electrode active material. Examples of the negative electrode active material include carbon materials such as graphite, hard carbon, and soft carbon, and the like. The negative electrode active material layer may contain other components than the active material, such as binders or thickeners. For example, styrene-butadiene rubbers (SBR) or the like may be used as a binder. For example, carboxymethylcellulose (CMC) or the like may be used as a thickener.

The active material layer is typically formed on a current collector. Examples of the current collector include aluminum foils, copper foils, and the like.

The operations for each step are as described above. This production method of an electrode-integrated separator of a secondary battery is excellent in that an electrode-integrated separator of a secondary battery can be produced by a small number of steps.

A separator-integrated electrode thus produced as above may be used for various types of secondary batteries according to known methods. Examples of suitable secondary batteries include a lithium secondary battery. The lithium secondary battery may be suitably used for portable power sources for personal computers, mobile devices, etc., or vehicle driving power sources for electric cars (EVs), hybrid cars (HVs), plug-in hybrid cars (PHVs), etc.

EXAMPLES

Examples relating to the present disclosure will be described below, but the present disclosure is not intended to be limited to those shown in such examples.

Example 1

In a sample bottle, 2.1 parts by mass of cellulose acetate (produced by Sigma-Aldrich Co. LLC, average molecule weight: 50,000) was weighed. To this sample bottle, 10 parts by mass of acetone, which was a good solvent, was added. The sample bottle was heated to 40° C. to 50° C., and cellulose acetate was completely dissolved in acetone. After that, 1.5 parts by mass of water, which was a poor solvent, was added to the sample bottle and stirred. In this way, a cellulose acetate solution containing a mixed solvent of acetone/water as a solvent was obtained.

The cellulose acetate solution was applied onto an aluminum foil, which was a substrate, by casting. At this time, the application thickness was 200 μm.

A belt conveyor-type drying furnace, in which a heat exchanger was connected thereto on the upstream side and a boiler was connected thereto on the further upstream side was prepared. Water vapor was generated in the boiler, and the water vapor was then fed into the heat exchanger and heated to change into superheated water vapor. The temperature in the drying furnace was set to 150° C., and this superheated water vapor was fed into the drying furnace at a flow rate of 100 kg/hr, and the drying furnace was left to stand until the temperature became stable at 150° C. After that, the aluminum foil onto which the cellulose acetate solution had been applied was introduced into the drying furnace and dried for 60 seconds to remove the mixed solvent of acetone/water. In this way, a porous film of cellulose acetate was obtained on the aluminum foil.

Example 2

A porous film of cellulose acetate was produced in a similar manner to Example 1, except that the temperature in the drying furnace was changed to 200° C.

Comparative Example 1

The cellulose acetate solution prepared in Example 1 was applied onto an aluminum foil, which was a substrate, by casting. At this time, the application thickness was 200 μm. The aluminum foil onto which the cellulose acetate solution had been applied was introduced into a hot air drier set to 30° C. and dried for 60 seconds to remove the mixed solvent of acetone/water. In this way, a porous film of cellulose acetate was obtained on the aluminum foil.

Comparative Example 2

The cellulose acetate solution prepared in Example 1 was applied onto an aluminum foil, which was a substrate, by casting. At this time, the application thickness was 200 μm. The aluminum foil onto which the cellulose acetate solution had been applied was introduced into a hot air drier set to 60° C. and dried for 60 seconds to remove the mixed solvent of acetone/water. In this way, a porous film of cellulose acetate was obtained on the aluminum foil.

Comparative Example 3

The cellulose acetate solution prepared in Example 1 was applied onto an aluminum foil, which was a substrate, by casting. At this time, the application thickness was 200 μm. The aluminum foil onto which the cellulose acetate solution had been applied was placed on a hotplate, the surface temperature of which was set to 50° C., and dried for 60 seconds to remove the mixed solvent of acetone/water. In this way, a porous film of cellulose acetate was obtained on the aluminum foil.

Example 3

In s sample bottle, 1.0 part by mass of a vinylidene fluoride-hexafluoropropylene copolymer ("Kynar-FLEX 2821-00", grade: powder type, produced by Arkema S. A.; hereinafter, referred to as "P(VDF-HFP)") was weighed. To this sample bottle, 3.2 parts by mass of methyl ethyl ketone (MEK), which was a good solvent, was added. The sample bottle was heated to 40° C. to 50° C., and the P(VDF-HFP) was completely dissolved in MEK. After that, 0.4 parts by mass of 1,2-propanediol, which was a poor solvent, was added to the sample bottle and stirred. In this way, a P(VDF-HFP) solution containing a mixed solvent of MEK/propanediol as the solvent was obtained.

The P(VDF-HFP) solution was applied onto an aluminum foil, which was a substrate, by casting. At this time, the application thickness was 200 μm.

A belt conveyor-type drying furnace, in which a heat exchanger was connected thereto on the upstream side and a boiler was connected thereto on the further upstream side was prepared. Water vapor was generated in the boiler and the water vapor was then fed into the heat exchanger and heated to change into superheated water vapor. The temperature in the drying furnace was set to 170° C. and this superheated water vapor was fed into the drying furnace at a flow rate of 100 kg/hr, and the drying furnace was left to stand until the temperature became stable at 170° C. After that, the aluminum foil onto which the P(VDF-HFP) solution had been applied was introduced into the drying furnace and dried for 60 seconds to remove the mixed solvent of MEK/propanediol. In this way, a porous film of the P(VDF-HFP) was obtained on the aluminum foil.

Comparative Example 4

The P(VDF-HFP) solution prepared in Example 3 was applied onto an aluminum foil, which was a substrate, by casting. At this time, the application thickness was 200 μm. The aluminum foil onto which the P(VDF-HFP) solution had been applied was introduced into a hot air drier set to 100° C. and dried for 60 seconds to remove the mixed solvent of MEK/propanediol. In this way, a porous film of the P(VDF-HFP) was obtained on the aluminum foil.

Comparative Example 5

The P(VDF-HFP) solution prepared in Example 3 was applied onto an aluminum foil, which was a substrate, by casting. At this time, the application thickness was 200 μm. The aluminum foil onto which the P(VDF-HFP) solution had been applied was placed on a hotplate, the surface temperature of which was set to 80° C., and dried for 60 seconds to remove the mixed solvent of MEK/propanediol. In this way, a porous film of the P(VDF-HFP) was obtained on the aluminum foil.

Evaluation on Liquid Penetration

Ethanol was dropped on the front surfaces of porous films obtained in Examples and Comparative Examples, and whether or not the ethanol penetrated to the rear surface was evaluated by the eye. Table 1 shows the results. When the ethanol penetrated to the rear surface of the porous film, it is determined that there was no skin layer and the porous film became porous as a whole. Meanwhile, when the ethanol did not penetrate, it is determined that a skin layer was formed at the surface portion of the porous film.

Evaluation by SEM Observation

Figure 3:
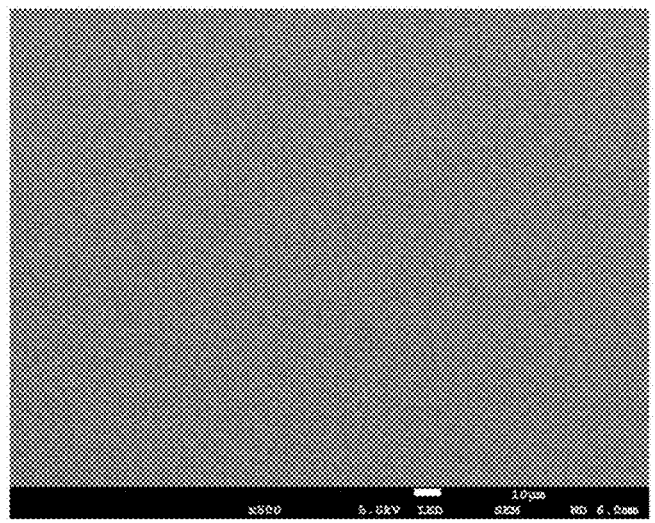
FIG. 3 is a SEM image of the surface of the porous film obtained in Comparative Example 1.
Figure 4:
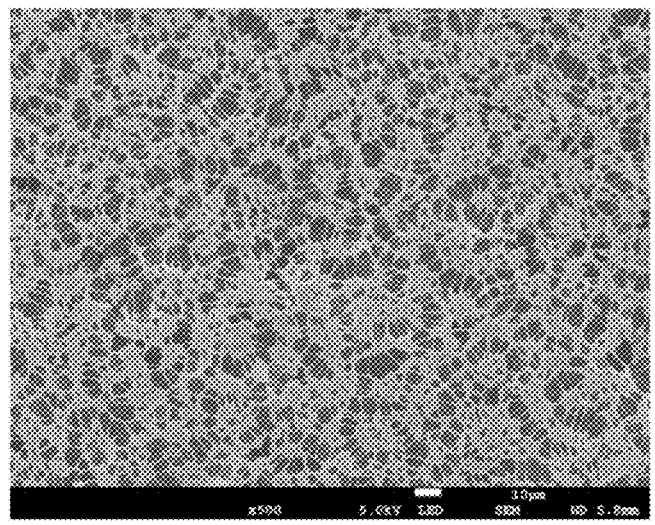
FIG. 4 is a SEM image of the surface of the porous film obtained in Example 1.
Figure 5:
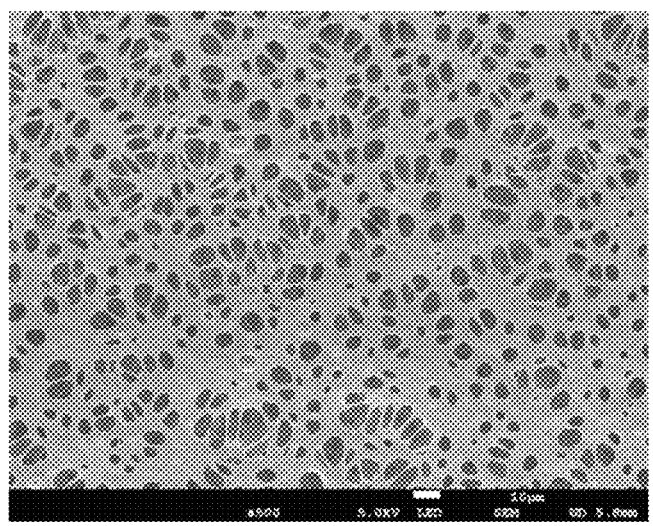
FIG. 5 is a SEM image of the surface of the porous film obtained in Example 3.

The surfaces of the porous film obtained in Comparative Example 1 and Examples 1 and 3 were observed by a scanning electron microscope (SEM). FIGS. 3 to 5 respectively show SEM images of the surfaces of the porous films obtained in Comparative Example 1 and Examples 1 and 3.

TABLE 1

| | Resin type | Drying method | Drying temperature | Skin layer |
|---|---|---|---|---|
| Example 1 | Cellulose acetate | Superheated water vapor | 150° C. (In-furnace temperature) | Not formed |
| Example 2 | Cellulose acetate | Superheated water vapor | 200° C. (In-furnace temperature) | Not formed |
| Comparative Example 1 | Cellulose acetate | Hot air | 30° C. (In-furnace temperature) | Formed |
| Comparative Example 2 | Cellulose acetate | Hot air | 60° C. (In-furnace temperature) | Formed |
| Comparative Example 3 | Cellulose acetate | Hot plate | 50° C. (Surface temperature) | Formed |
| Example 3 | P(VDF-HFP) | Superheated water vapor | 170° C. (In-furnace temperature) | Not formed |
| Example 4 | P(VDF-HFP) | Superheated water vapor | 200° C. (In-furnace temperature) | Not formed |
| Comparative Example 4 | P(VDF-HFP) | Hot air | 100° C. (In-furnace temperature) | Formed |
| Comparative Example 5 | P(VDF-HFP) | Hot plate | 80° C. (Surface temperature) | Formed |

Example 4

A porous film of the P(VDF-HFP) was obtained on the aluminum foil in a similar manner to Example 3, except that the drying temperature in the drying furnace was set to 200° C.

As indicated by the result in Table 1, ethanol did not penetrate to the rear surface of the porous film in Comparative Example 1, in which the drying was performed by the hot air. Furthermore, as shown in the SEM image (FIG. 3), no pores were found in the front surface of the porous film obtained in Comparative Example 1. This result demonstrates that a skin layer was formed at the front surface of the porous film in Comparative Example 1. In addition, ethanol did not penetrate to the rear surface of the porous film and it is found that a skin layer was formed also in Comparative Example 2, in which the temperature of the hot air was raised, or in Comparative Example 3, in which the heating method was changed to a hotplate.

On the contrary, the ethanol penetrated to the rear surfaces of the porous films in Examples 1 and 2, in which the drying was performed with the superheated water vapor. Furthermore, as shown in the SEM image (FIG. 4), many pores were observed on the front surfaces of the porous films obtained in Examples 1 and 2. This result demonstrates that no skin layers were formed, and the porous films were made porous in Examples 1 and 2. It should be noted that no difference was found in the porous structures of the obtained porous films between Example 1 and Example 2.

The results of Examples 3 and 4 and Comparative Example 4 and 5, as well as FIG. 5, demonstrate that no skin layers were formed and the porous films were made porous by drying using superheated water vapor even when different types of resins were used. These results demonstrate that the skin layer formation-suppressing effect due to drying using superheated water vapor is exerted to resins to which water becomes a poor solvent (that is, water-insoluble polymers).

In the above Examples, steps essential for producing resin porous materials are the steps for preparing a solution of a water-insoluble polymer and removing a mixed solvent by drying. Thus, the above results demonstrate that, according to the present disclosure, a resin porous material can be produced from a water-insoluble polymer in a small number of steps while suppressing the formation of skin layers.

What is claimed is:

1. A production method of a resin porous material, the method comprising:
   preparing a solution of a water-insoluble polymer in a mixed solvent including a good solvent of the water-insoluble polymer and a poor solvent of the water-insoluble polymer and
   drying the solution to remove the mixed solvent, wherein the poor solvent has a higher boiling point than the good solvent,
   the drying the solution is performed using superheated water vapor, wherein the superheated water vapor has a temperature above 100° C., and
   the water-insoluble polymer is an ethylene-vinyl alcohol copolymer.

2. The production method according to claim 1, further comprising, after preparing the solution and before drying the solution, applying the prepared solution of the water-insoluble polymer on a surface of a substrate in a film form.

3. The production method according to claim 2, wherein the substrate is an electrode of a secondary battery.

* * * * *